United States Patent
He

(10) Patent No.: US 12,554,957 B2
(45) Date of Patent: Feb. 17, 2026

(54) RESONATING BACKSCATTER RADIO SYSTEM WITH PULSE POSITION MODULATION

(71) Applicant: Telefonaktiebolaget LM Ericsson (publ), Stockholm (SE)

(72) Inventor: Shousheng He, Södra Sandby (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 108 days.

(21) Appl. No.: 18/685,630

(22) PCT Filed: Aug. 24, 2021

(86) PCT No.: PCT/EP2021/073409
§ 371 (c)(1),
(2) Date: Feb. 22, 2024

(87) PCT Pub. No.: WO2023/025374
PCT Pub. Date: Mar. 2, 2023

(65) Prior Publication Data
US 2024/0354543 A1  Oct. 24, 2024

(51) Int. Cl.
*G06K 19/07* (2006.01)
*H02J 50/20* (2016.01)
(Continued)

(52) U.S. Cl.
CPC ..... *G06K 19/0715* (2013.01); *G06K 19/0723* (2013.01); *H02J 50/20* (2016.02);
(Continued)

(58) Field of Classification Search
CPC . G06K 19/0715; G06K 19/0723; H02J 50/80; H02J 50/20; H04B 5/20; H04B 5/45; H04B 5/77; H04B 14/026
(Continued)

(56) References Cited

U.S. PATENT DOCUMENTS

2006/0145819 A1   7/2006   Scott et al.
2007/0247311 A1   10/2007  Muchkaev
(Continued)

FOREIGN PATENT DOCUMENTS

EP   0681192 A2   11/1995
EP   2763076 A1   8/2014
(Continued)

OTHER PUBLICATIONS

International Search Report and Written Opinion dated May 23, 2022 for International Application No. PCT/EP2021/073409 filed Aug. 24, 2021; consisting of 9 pages.
(Continued)

*Primary Examiner* — Michael G Lee
*Assistant Examiner* — David Tardif
(74) *Attorney, Agent, or Firm* — Weisberg I.P. Law, P.A.

(57) ABSTRACT

A backscatter radio system having a transceiver module and a transponder. The transceiver module is configured to generate and transmit a radio frequency pulse signal with Pulse Position Modulation (PPM). The generated radio frequency pulse signal includes a power and information transferring pulse and a time reference pulse within a dual symbol duration comprising a first and a second symbol periods. The power and information transferring pulse enables a power injection to a rectifier circuit in the transponder and the time reference pulse enables an excitation of a resonance signal in a resonance circuit in the transponder. A response radio frequency pulse signal with PPM is generated using the resonance signal generated in the resonance circuit with a time offset such that the first and second symbol periods are separated in the time domain.

11 Claims, 6 Drawing Sheets

(51) Int. Cl.
*H02J 50/80* (2016.01)
*H04B 5/20* (2024.01)
*H04B 5/45* (2024.01)
*H04B 5/77* (2024.01)
*H04B 14/02* (2006.01)

(52) U.S. Cl.
CPC ............ *H02J 50/80* (2016.02); *H04B 5/20* (2024.01); *H04B 5/45* (2024.01); *H04B 5/77* (2024.01); *H04B 14/026* (2013.01)

(58) Field of Classification Search
USPC .......................................................... 235/492
See application file for complete search history.

(56) References Cited

U.S. PATENT DOCUMENTS

| | | | |
|---|---|---|---|
| 2018/0138889 A1* | 5/2018 | Rinaldi | H03H 9/171 |
| 2019/0207557 A1* | 7/2019 | Rocheleau | H03H 9/2447 |
| 2023/0018665 A1* | 1/2023 | He | H02J 50/80 |
| 2024/0354543 A1* | 10/2024 | He | H02J 50/20 |

FOREIGN PATENT DOCUMENTS

| | | |
|---|---|---|
| WO | 2016144535 A1 | 9/2016 |
| WO | 2021121635 A1 | 6/2021 |

OTHER PUBLICATIONS

Suresh, K. et al.; A Comparative Survey on Silicon Based and Surface Acoustic Wave (SAW) Based RFID Tags: Potential, Challenges and Future Directions; IEEE Access; vol. 8, pp. 91624-91647; 2020; consisting of 24 pages.

Lee, B., et al.; An Overview of Data Telemetry in Inductively Powered Implantable Biomedical Devices; IEEE Communications Magazine; Design and Implementation of Devices, Circuits, and Systems; Feb. 2019; consisting of 7 pages.

Trotter, M., et al.; Survey of Range Improvement of Commercial RFID Tags with Power Optimized Waveforms; 2010 IEEE International Conference on RFID (IEEE RFID 2010), Orlando, FL, USA, 2010, pp. 195-202; consisting of 8 pages.

Dobkin, D.M.; The RF in RFID Passive UHF RFID in Practice; Elsevier Inc., 2008; Burlington, MA, USA; consisting of 7 pages.

Wikipedia, The Free Encyclopedia; Pulse-position modulation; Apr. 21, 2021; consisting of 3 pages.

* cited by examiner ded transmission, for example, in a Near Field Communication (NFC) environment using separated power and data links, the latter utilizes carrier-less pulses, for improving the data rate in implanted medical devices application.

RESONATING BACKSCATTER RADIO SYSTEM WITH PULSE POSITION MODULATION

CROSS-REFERENCE TO RELATED APPLICATION

This application is a Submission Under 35 U.S.C. § 371 for U.S. National Stage Patent Application of International Application Number: PCT/EP2021/073409, filed Aug. 24, 2021 entitled "RESONATING BACKSCATTER RADIO SYSTEM WITH PULSE POSITION MODULATION," the entirety of which is incorporated herein by reference.

TECHNICAL FIELD

Embodiments herein relate to a backscatter radio system and method therein for transferring power and information. In particular, the embodiments relate to a backscatter radio system comprising a transceiver module and a transponder and methods therein for monostatic far field communication.

BACKGROUND

Semi-passive or low power and passive devices have been used in various applications. Passive devices are powered entirely by the energy received from an incoming radio frequency (RF) signal. Semi-passive devices have a battery and consume power to perform baseband processing but lack a power amplifier and many other components present in a typical RF transmitter signal chain. Thus, both passive and semi-passive devices are power efficient. The passive and semi-passive devices have good potential in Internet of Things (IoT) applications, due to their low power consumption.

The semi- or passive devices generate transmitting signals by using an antenna mismatched to the incoming RF carrier signal, thus reflecting or backscattering the incoming radio waves, and by modulating the reflected electromagnetic waves in order to transmit data or information to a receiving unit, often referred as Backscatter Radio (BSR).

BSR has been widely used in Radio Frequency Identification (RFID) and Near Field Communication (NFC) setups for communication with low power/passive devices.

In a classical BSR system, a transmitter sends out an RF signal in Continuous Wave (CW), or a single frequency carrier to a low power/passive device, often called a tag, a transponder, or a semi-active device, which modulates the CW RF signal by switching on and off a load, i.e. a type of On-Off Keying (OOK) modulation, of its antenna located in the field where the sending RF signal is strong. The load switching of the backscatter antenna thus affects the propagation of the RF signal via so called "backscatter modulation" also known as "load modulation", where the RF signal is scattered with different strength depending on the switching load of the tag antenna. This scattered RF signal, modulated by the tag, can be then sensed by a receiving antenna to demodulate and retrieve the information sent from the tag. K. SURESH, et. al., "A Comparative Survey on Silicon Based and Surface Acoustic Wave (SAW) Based RFID Tags: Potentials, Challenges and Future Directions, IEEE Access, 20200227 IEEE, USA, vol. 8, 91624-91647, provides a rather updated survey. B. Lee et. al., "An Overview of Data Telemetry in Inductively Powered Implantable Biomedical Devices", IEEE COMMUNICATIONS MAGAZINE, 20190201 IEEE SERVICE CENTER, PISCATAWAY, US, vol. 57, no. 2, 74-80, shows certain exten- A BSR system may have two different configurations, bistatic and monostatic configurations.

In a bistatic configuration, the transmitter and the receiver of the RF signal are separated sufficiently and the tag with backscatter antenna is located within the field of the RF signal. With this configuration a BSR can operate over fairly large distance, a few hundred meters if a semi-active tag is placed between the transmitter and the receiver. The tag cannot be energized at that distance, but the tag uses very little energy with BSR. However, the complexity and cost of the setup of a bistatic BSR system is much higher due to fabrication and installation of two radios for transmitter and receiver respectively that must be well separated and insulated. A reflector near the transmitter also destroys the BSR operation. Bistatic configuration is thus not viable for BSR system in many practical application scenarios.

In a monostatic configuration, the transmitter and the receiver of the RF signal are co-located, often built compactly on a single device with shared transmitter and receiver (Tx/Rx) antenna, i.e., a transceiver, also called a "reader" or "interrogator". The reader transceiver is optionally equipped with a complex directional multiport circuit, known as a circulator, which can provide a directional separation up to 40-50 dB. However, due to the strong self-interference, a classical BSR system with monostatic configuration can only operate at a very short distance, referred often as Near Field, usually a few to a few tens center meters, e.g. for a credit card with a built-in RFID tag.

The fundamental reasons for the short operation range of the classical BSR in a monostatic configuration with shared Tx/Rx antenna are:
  With regulations limited reader transmission power, the tag cannot acquire sufficient power for its operation;
  Reader cannot detect the backscatter signal due to the difficulty to separate the received backscatter signal from the transmitting CW signal;
  If there are multiple devices in the field, the interferences from different tags will make the classical BSR barely functional.

There are some efforts to improve the operation range of BSR, for example, a Power Optimized Waveform (POW) may be used instead of the CW signal for power transferring. For some tags in bistatic configuration, the POW waveform enlarges the range due to improved power sensitivity. However, for monostatic configuration, the detection of the backscatter signal becomes even more difficult, since the envelop of the load modulated signal becomes obscure.

SUMMARY

It is therefore an object of embodiments herein to provide an improved backscatter radio system and methods therein for monostatic far field communication.

According to a first aspect of embodiments herein, the object is achieved by a transceiver module and method therein for transferring power to a transponder and for transferring information between the transceiver module and transponder in a backscatter radio system.

The transceiver module generates a radio frequency pulse signal with Pulse Position Modulation (PPM). The generated radio frequency pulse signal comprises a power and information transferring pulse and a time reference pulse within a dual symbol duration comprising a first symbol period and a second symbol period. The information is coded by the position of the power and information transferring pulse with respect to the time reference pulse. The radio frequency pulse signal may be generated with a parameterized Gabor pulse function.

The transceiver module transmits during the first symbol period, the generated radio frequency pulse signal in a forward link from the transceiver module to the transponder. The power and information transferring pulse enables a power injection to a rectifier circuit comprised in the transponder and the time reference pulse enables an excitation of a resonance signal in a resonance circuit comprised in the transponder.

The transceiver module receives a response radio frequency pulse signal with PPM in a reverse link from the transponder to the transceiver module during the second symbol period. The response radio frequency pulse signal with PPM is generated using the resonance signal generated in the resonance circuit comprised in the transponder with a time offset such that the first and second symbol periods are separated in time domain.

According to a second aspect of embodiments herein, the object is achieved by a transponder for receiving power from a transceiver module and for transferring information between the transponder and transceiver module in a backscatter radio system. The transponder comprises an antenna configured to receive a radio frequency pulse signal in a forward link from the transceiver module to the transponder during a first symbol period and transmit a response radio frequency pulse signal in a reverse link from the transponder to the transceiver module during a second symbol period. Both the radio frequency pulse signal and the response radio frequency pulse signal are modulated with Pulse Position Modulation (PPM). The received radio frequency pulse signal comprises a power and information transferring pulse and a time reference pulse within a dual symbol duration comprising the first symbol period and a second symbol period.

The transponder further comprises a switch network coupled to the antenna.

The transponder further comprises a resonance circuit coupled to the antenna by a first switch in the switch network. The resonance circuit is configured to have a resonant frequency at the carrier frequency of the received time reference pulse and generate a resonance signal at the carrier frequency of the received time reference pulse in response to the received time reference pulse.

The transponder further comprises a rectifier circuit coupled to the antenna by a second switch in the switch network and configured to convert the received power and information transferring pulse to power. The response radio frequency pulse signal with PPM is generated using the resonance signal generated in the resonance circuit with a time offset such that the first and second symbol periods are separated in time domain.

According to a third aspect of embodiments herein, the object is achieved by a method performed in a transponder for receiving power from a transceiver module and for transferring information between the transponder and transceiver module in a backscatter radio system. The transponder comprises a resonance circuit coupled to an antenna by a first switch, a rectifier circuit coupled to the antenna by a second switch and to the resonance circuit by a third switch.

The transponder receives, at the antenna, a radio frequency pulse signal transmitted in a forward link from the transceiver module to the transponder during a first symbol period. The radio frequency pulse signal is modulated with Pulse Position Modulation (PPM) and comprises a power and information transferring pulse and a time reference pulse within a dual symbol duration comprising the first symbol period and a second symbol period. The information is coded by the position of the power and information transferring pulse with respect to the time reference pulse.

The transponder converts the received power and information transferring pulse to power in the rectifier circuit by switching on the second switch during the power transferring and information pulse slot.

The transponder generates a resonance signal in the resonance circuit, in response to the received time reference pulse, by switching on the first switch during the time reference pulse slot. The resonance circuit is configured to have a resonant frequency at a carrier frequency of the received time reference pulse and the resonance signal is generated at the carrier frequency of the received time reference pulse.

The transponder generates a response radio frequency pulse signal with PPM by switching on the first switch during a designated PPM time slot within the second symbol period. The designated PPM time slot is configured with a time offset such that the first and second symbol periods are separated in time domain.

The transponder transmits the generated response radio frequency pulse signal in a reverse link from the transponder to the transceiver module during the second symbol period.

The transponder resets the resonance circuit by switching on the third switch each time after the response radio frequency pulse signal has been transmitted.

According to a fourth aspect of embodiments herein, the object is achieved by a backscatter radio system and method therein for transferring power and information. The backscatter radio system comprises a transceiver module and a transponder.

The backscatter radio system is configured to generate by the transceiver module, a radio frequency pulse signal with Pulse Position Modulation (PPM). The generated radio frequency pulse signal comprises a power transferring pulse and a time reference pulse within a dual symbol duration comprising a first symbol period and a second symbol period. The information is coded by the position of the power and information transferring pulse with respect to the time reference pulse.

The backscatter radio system is further configured to transmit the radio frequency pulse signal in a forward link from the transceiver module to the transponder during the first symbol period. The power and information transferring pulse enables a power injection to a rectifier circuit comprised in the transponder and the time reference pulse enables an excitation of a resonance signal in a resonance circuit comprised in the transponder.

The backscatter radio system is further configured to receive at the transponder, the radio frequency pulse signal from the transceiver module.

The backscatter radio system is further configured to convert, at the transponder, the received power and information transferring pulse to power.

The backscatter radio system is further configured to generate a resonance signal at a carrier frequency of the received time reference pulse in the resonance circuit comprised in the transponder, in response to the received time reference pulse.

The backscatter radio system is further configured to generate by the transponder, a response radio frequency pulse signal with PPM during the second symbol period.

The backscatter radio system is further configured to transmit the response radio frequency pulse signal with PPM in a reverse link from the transponder to the transceiver module during the second symbol period. The response radio frequency pulse signal with PPM is generated using the resonance signal generated in the resonance circuit comprised in the transponder with a time offset such that the first and second symbol periods are separated in time domain.

Embodiments herein devise a unique mechanism with PPM RF signals to enable a BSR system to operate in a monostatic configuration in a practical range of several meters, referred as Far Field Communication (FFC). The transponder is powered by a RF signal consists of Gabor pulses that has a higher rectifier efficiency than a CW or any Orthogonal Frequency Division Multiplexing (OFDM) waveform. RF signals in both the forward and reverse links are encoded with PPM, where the information is encoded according to the position of the pulse, for information transferring. The response backscatter signal is separated from the transmitting signal in time domain in a form of time offset PPM by utilizing a resonance signal generated in a resonance circuit comprised in the transponder. The timing of connection of the resonance circuit to a backscatter antenna is under a PPM control thereby generating a response signal with PPM and a time offset. Due to the flexibility of carrier frequency of Gabor pulses, the proposed BSR system may operate in many different frequencies and bandwidth of choice.

Advantages of the proposed BSR system utilizing a PPM modulated resonating response of Gabor pulses are that it enables the receiving of a backscattered signal from a transponder to be separated in time domain from the transmitting of a signal in a transceiver with a monostatic configuration, thus facilitates a reliable reception. This, together with a higher rectifier efficiency in the transponder due to the Gabor pulse RF signals, greatly extends the range of the BSR system in a monostatic configuration without increasing operation power level. With sufficient separation of the transmitting and receiving signals in the time domain, a transceiver of a monostatic BSR system with shared Tx/Rx antenna can be built compactly and economically e.g. into a User Equipment (UE) or mobile handset device, thus extending the functionalities of a NFC to the range of FFC. Consequently, a UE with the feature of supporting FFC with passive devices can find applications in many scenarios which have been prohibitive for NFC, for example:

- Pet and farm animal identification from a safe distance of several meters with a UE that support FFC.
- Enable a UE to communicate with passive Human Interface Devices (HIDs), or peripheral devices such as a keyboard and a mouse without wire-connection at a comfortable distance.
- Enable a UE to communicate with a passive RFID at a secure distance, for example an RFID on a container or a vehicle e.g. for parking, tolling etc.
- Enable a UE to communicate with passive sensing devices which are watertight and/or airtight and maintain free, such as sensors of temperature, stress, chemical compound etc., at a convenient distance.
- Enable a powered device, such as a flat panel TV/PC hanging on a wall, to communicate with passive HID devices, such as a passive keyboard in a thin plastic sheet on a coffee table.

Therefore, the embodiments herein provide an improved backscatter radio system and methods therein for monostatic far field communication.

BRIEF DESCRIPTION OF THE DRAWINGS

Examples of embodiments herein are described in more detail with reference to attached drawings in which.

DETAILED DESCRIPTION

As part of developing embodiments herein, problems and limitations of a classical BSR system will first be identified and discussed.

It is often ambiguous what a monostatic configuration means. In some literature, when the transmitter Tx and the receiver Rx are co-located, for example on the same device, with separate Rx and Tx antennas, it is termed as a monostatic configuration, which is actually a co-located bistatic configuration. In the context of this application, monostatic dictates that the transmitter and receiver share the same antenna.

For a monostatic BSR system, the power ratio of the received backscatter RF signal to that of the transmitted CW signal is governed by the famous radar equation:

$$\frac{P_r}{P_t} = \frac{G\lambda^2 \sigma}{(4\pi)^3 r^4} \quad (1)$$

Where $P_r$ is the power of the received backscatter RF signal, $P_t$ is the power of the transmitting CW signal, G is the combined reader-tag antenna gain, $\lambda$ is the wavelength of the radio frequency, $\sigma$ is the Radar Cross Section (RCS), related to antenna material, size relative to the wavelength and the incident angle etc. of the backscatter signal, r is the range that spans the distance between the reader and the tag. The most prominent character of the radar equation is that the power ratio of the received/transmitted signals is inversely proportional to the $4^{th}$ power of the range r.

For a typical set of parameters, it can be easily seen, that $$\frac{P_r}{P_t} < -88 \, dB$$

when r is only a few meters. In addition, even a good quality antenna has a return loss of 15 dB e.g. due to reflections. For a classical BSR system, the backscatter signal is received essentially at the same time as the CW signal is transmitted. Due the narrowband nature of the backscatter radio system, the backscatter signal has energy concentrated very close to the carrier of the transmitted signal in frequency domain. Thus, a receiver in a classical monostatic BSR system, even with a sophisticated circulator, is not able to distinguish the received backscatter signal, either in frequency or time domain, from such a strong self-interference signal which comes from its own transmitter to the same antenna with a power level over 80 dB higher. In practice even co-located bistatic configuration does not work in many scenarios since the backscatter signal will be deeply buried in any closer reflection of the CW. In addition, using a CW stimulus to transfer RF energy to the tag is of lower efficiency due to the threshold effect of the rectifier at the tag.

Figure 1A:
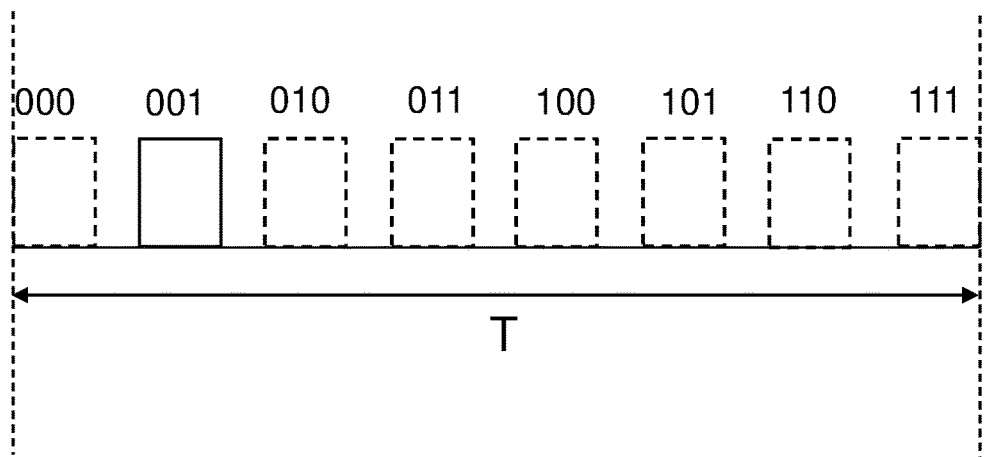
FIG. 1A is a diagram showing an example of PPM.

To overcome these limitations, a unique resonator based PPM BSR system is provided for FFC operation in a monostatic configuration according to embodiments herein. Pulse Position modulation (PPM) is a form of signal modulation in which M message bits are encoded by transmitting a single pulse in one of $2^M$ possible required time shifts. This is repeated every T second, such that the transmitted bit rate is M/T bits per second. FIG. 1A shows an example of 3-bit 8-PPM signal, where bits encoded by the positions of pulses are shown. The modulation alphabet, i.e. the symbol duration, is 8 slots to accommodate the pulses according to the modulation.

Figure 1B:
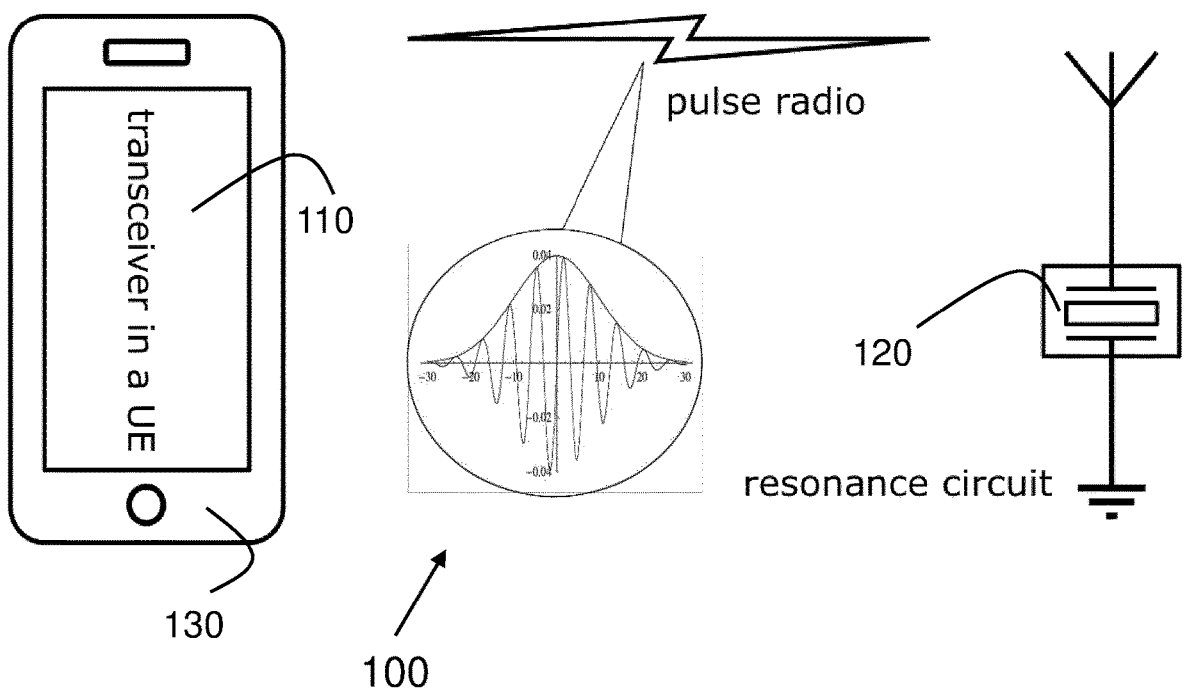
FIG. 1B is a simplified scheme showing a transponder with a resonance circuit resonates with an RF signal in the form of Gabor pulse according to embodiments herein.

FIG. 1B shows a simplified scheme of a BSR system 100 comprising a transceiver module 110 and a transponder 120 shown as a resonance circuit.

The transceiver module 110, compactly built into a communication device 130, e.g. a UE, sends a chain of RF pulses in the form of parameterized Gabor function, which is a generalization of the Gaussian pulse, that can be described mathematically as $$G(t, \omega, \sigma, \tau, \theta) = \sin(\omega t + \theta)e^{-\frac{1}{2}\left(\frac{t-\tau}{\sigma}\right)^2} \quad (2)$$

Where t and ω are time and carrier frequency of the RF signal respectively, σ specifies the spectrum width of the Gaussian pulse, thus also constrains the narrowness of the pulse in the time domain, τ represents the time shift of the Gaussian pulse and θ the initial phase of the carrier. The parameterized Gabor pulse is thus simply a Gaussian pulse shifted in both time and frequency domains.

An advantage of using a radio frequency pulse signal with a Gabor function instead of CW RF signal for energizing the transponder 120 with a WPT process is that a higher efficiency can be achieved. For a classical BSR system with CW RF signal, due to the threshold of the rectifier at the transponder, signals with level below the threshold cannot be converted to direct current (DC) and thus a significant portion of CW RF energy is not harvested. If a signal has a high Peak to Average Power Ratio (PAPR), it will have a larger portion of the signal that is higher than the threshold. A pulse signal compresses the signal energy in the time domain and thus has a very high PAPR. This leads to a higher WPT efficiency. Different waveforms have a different PAPR due to that the signal energy distributes differently in the time domain.

Figure 2:
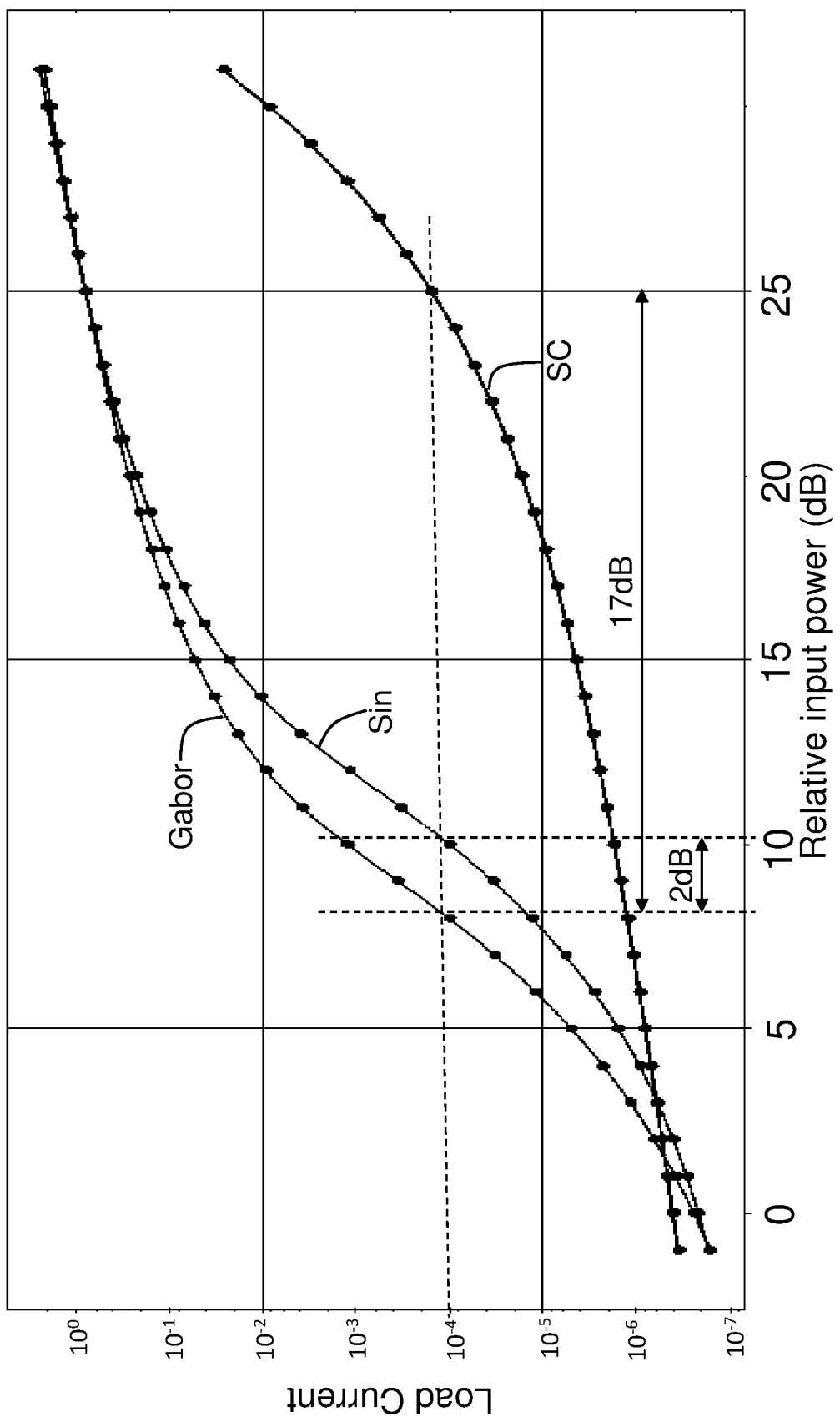
FIG. 2 is a diagram comparing rectifying efficiency for different waveforms.

It has been proven via non-linear simulations with a large signal modeling methodology, that the Gabor pulse has a significant advantage over a CW waveform, around 16 dB with σ=16, in the most interesting rectifying level, e.g. 0.1~1 mA, for RF energy harvesting. FIG. 2 shows the simulation results, where the rectifying curves of load currents versus the relative input power for single carrier (SC), co-phased sin waves (Sin) and Gabor pulse signals are shown. At the load current of 10^−4 A, the difference of the relative input powers between the Gabor pulse and SC is 17 dB, as indicated in FIG. 2. In addition, as indicated in FIG. 2, at the load current of 10^−4 A, the difference of the relative input powers between the Gabor pulse and co-phased sin waves is 2 dB, so the Gabor pulse also has a 2 dB advantages over a pulse constitutes of co-phased sine waves, which can be considered as the extreme case of any OFDM waveform without information bearing.

When the resonance circuit is directly coupled with the antenna on the transponder, as the simplified scheme shown in FIG. 1, the resonance circuit begins to resonate when the radio frequency pulse signal injected to the antenna and if the carrier frequency of the radio frequency pulse signal meets its resonant frequency. Via semi-symbolic simulations, it has been proven that an electrical resonant circuitry, such as a Resistance-Inductance-Capacitor circuit (RLC) circuit, a crystal, a ceramic or a Microelectromechanical System (MEMS) oscillator, responses to the Gabor pulse signal with a carrier frequency corresponding to the resonance frequency of the circuit in a similar way as it responses to a step stimulus signal. A damped oscillation will be ignited in the resonance circuit, where the damping rate depends on the equivalent Quality (Q) factor of the circuitry.

Figure 3:
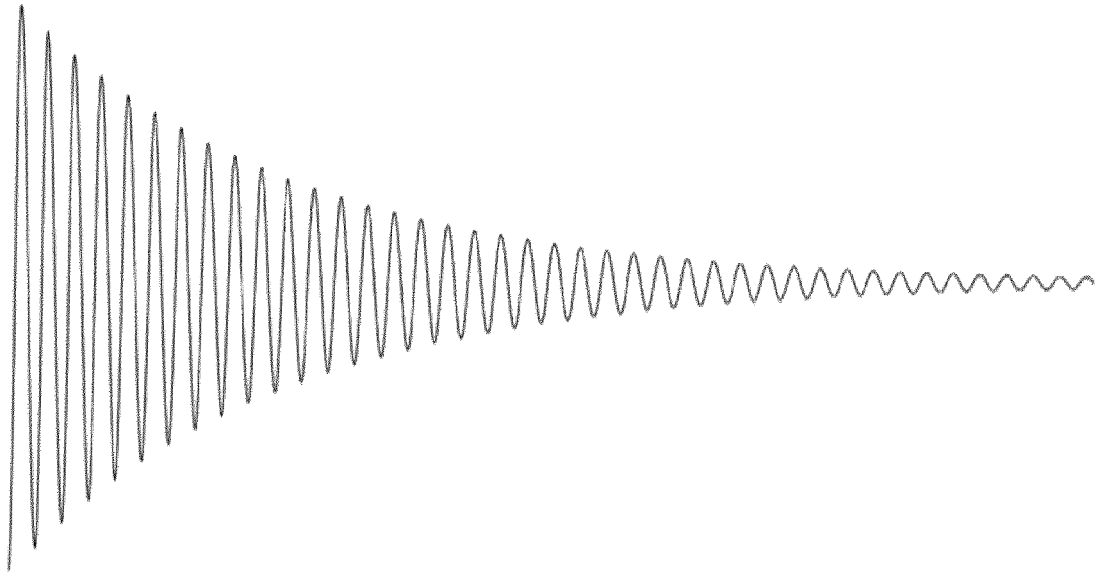
FIG. 3 is a diagram showing resonance signals in a resonance circuit with different Q values.
Figure 3:
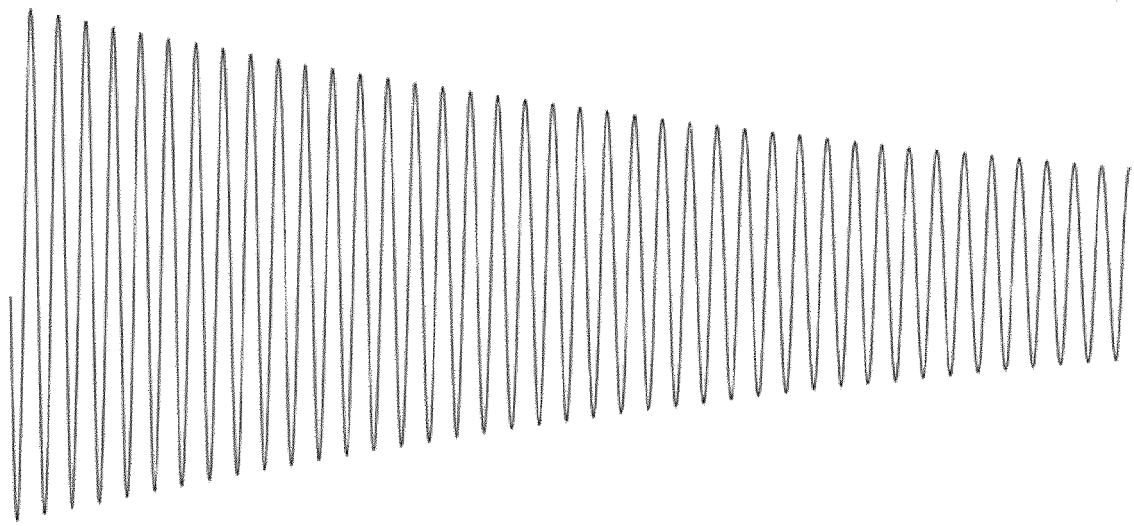

FIG. 3 shows damping oscillation simulation results when the equivalent Q-value is Q=32 and Q=128, respectively. As can be seen, the oscillation signal amplitude decays quickly when Q-value is lower.

When the Q-value of the resonance circuit is sufficiently high, the damped oscillation can last sufficiently long, several to several tens milliseconds, for example. Thus, the damped oscillation can be used as a lossy energy preserving device which can facilitate a time offset in a response signal generated using the oscillation signal and backscattered from the transponder in the BSR system 100.

A system where a transmitter uses a radio signal to transfer both information and power to a receiver is called a Wireless Information and Power Transferring (WIPT) system. The BSR system 100 according to embodiments herein is a WIPT setup where a transceiver module 110 transfers both information and power to a transponder 120 in a forward link from the transceiver module 110 to the transponder 120, and the transponder 120 utilizes the received energy, transfers information to the transceiver module 110 via a reverse link from the transponder 120 to the transceiver module 110.

Figure 4:
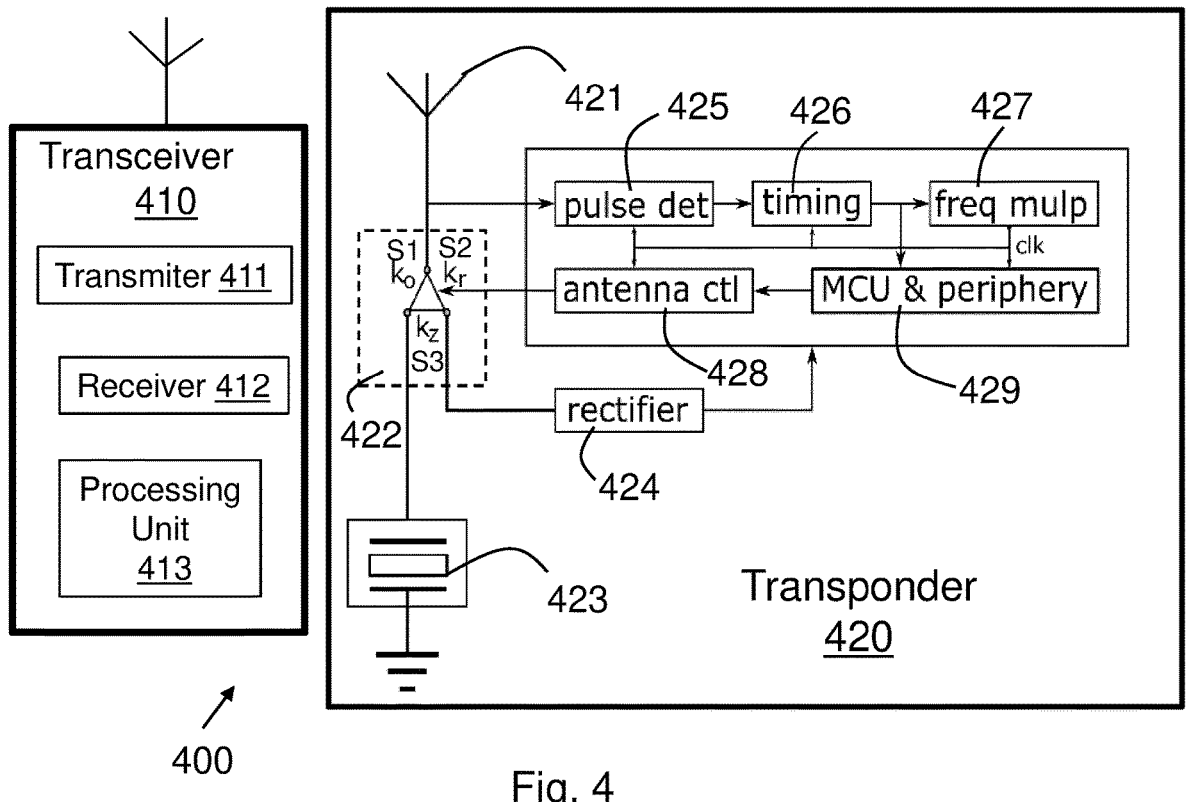
FIG. 4 is a schematic block diagram showing a BSR system according to embodiments herein.

FIG. 4 shows a schematic block diagram for a BSR system 400 according to embodiments herein. The BSR system 400 comprises a transceiver module 410 and a transponder 420. The BSR system 400 operates in a dual symbol duration, each dual symbol duration comprises a first symbol period and a second symbol period. The transceiver module 410 transmits a radio frequency pulse signal in a forward link from the transceiver module 410 to the transponder 420 during the first symbol period. The transponder 420 transmits a response radio frequency pulse signal in a reverse link from the transponder 420 to the transceiver module 410 during the second symbol period. Note that the first and the second symbol periods are not necessarily equal.

The transponder 420 comprises an antenna 421 configured to receive a radio frequency pulse signal in the forward link from the transceiver module 410 to the transponder 420 during the first symbol period and transmit a response radio frequency pulse signal in the reverse link from the transponder 420 to the transceiver module 410 during the second symbol period.

Both the radio frequency pulse signal and the response radio frequency pulse signal are modulated with Pulse Position Modulation (PPM).

The transceiver module 410 generates a radio frequency pulse signal comprises a power and information transferring pulse and a time reference pulse within the dual symbol duration.

The transceiver module 410 transmits during the first symbol period, the generated radio frequency pulse signal in the forward link to the transponder 420.

The transponder 420 further comprises a switch network 422 coupled to the antenna 421. The switch network 422 is a 3-way switch comprises a first switch S1, a second switch S2, and a third switch S3.

The transponder 420 further comprises a resonance circuit 423 coupled to the antenna 421 by the first switch S1 in the switch network 422. The resonance circuit 423 is configured to have a resonant frequency at a carrier frequency of the received time reference pulse and generate a resonance signal at the carrier frequency of the received time reference pulse in response to the received time reference pulse.

The transponder 420 further comprises a rectifier circuit 424 coupled to the antenna 421 by a second switch (S2/Kr) in the switch network 422 and configured to convert the received power and information transferring pulse to power.

Therefore, the power and information transferring pulse enables a power injection to the rectifier circuit 424 and the time reference pulse enables an excitation of a resonance signal in the resonance circuit 423.

The response radio frequency pulse signal with PPM is generated using the resonance signal generated in the resonance circuit 423 with a time offset such that the first and second symbol periods are separated in time domain.

By generating a resonance signal in the resonance circuit 423, the energy of incoming pulse signal is preserved by the oscillation signal and released at a later symbol period to generate a PPM backscatter signal. In this way, the backscatter PPM signal is separated in time from the incoming signal. This enables the transceiver module 410 to receive the backscatter signal much easier since the backscatter signal is separated in time from its own transmission.

In the following the operation of the transponder 420 will be described in detail.

Figure 5:
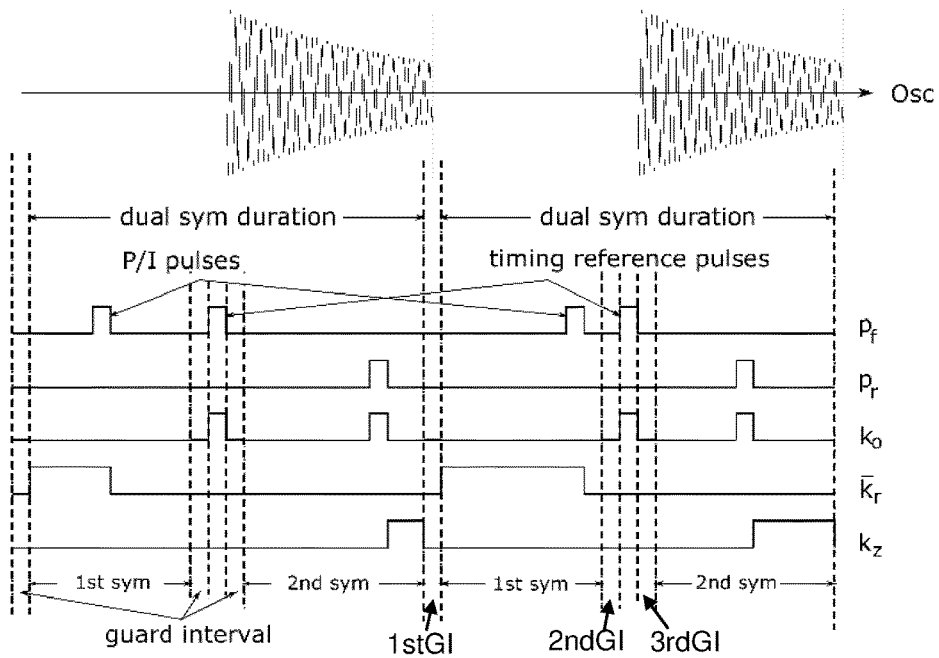
FIG. 5 is a diagram showing signal sequence for a BSR system according to embodiments herein.

The switch network 422 is used to redirect the antenna 421 connection to the resonance circuit 423 or the rectifier circuit 424. FIG. 5 shows an example sequence of PPM pulse signals in the forward and reverse links and switch control signals for the transponder 420 in the BSR system 400. The PPM pulse signal transmitted in the forward link is indicated by $P_f$, the PPM pulse signal transmitted in the reverse link is indicated by $P_r$. A set of 3 switch control signals is shown, where $k_o$ is used to control the first switch S1 between the antenna 421 and the resonance circuit 423, $\overline{k}_r$ is used to control the second switch S2 between the antenna 421 and the rectifier circuit 424, and $k_z$ is used to control the third switch S3 between the resonance circuit 423 and the rectifier circuit 424. Note that the third switch S3 controlled by $k_z$ has two purposes. One is to utilize any residue energy left in the resonance circuit 423 after sending the reverse link pulse. One is to reset the resonance circuit 423 for a next forward link pulse injection, thus avoiding any possible impairment due to the phase difference between the residue oscillation and the next forward link pulse injection.

Therefore, according to some embodiments herein, the rectifier circuit 424 is further coupled to the resonance circuit 421 by the third switch S3 in the switch network 422, and during operation, the rectifier circuit 424 converts the remaining resonance signal in the resonance circuit 421 to power thereby resetting the resonance circuit 423 by switching on the third switch S3.

The transponder 420, upon the reception of the incoming PPM pulse signal in the forward link $P_f$, responses with a PPM signal $P_r$ in the reverse link. Note that for information transferring, both signals in the forward and reverse links are PPM modulated.

As mentioned above, the radio frequency pulse signal in the forward link comprises a power and information transferring pulse marked with P/I pulses and a time reference pulse marked with Time reference pulses in FIG. 5, within a dual symbol duration marked with dual sym duration. The dual symbol duration comprises a first symbol period 1st sym and second symbol period 2nd sym as indicted in FIG. 5. The timing of the power and information transferring pulse and time reference pulse is configured to be time-reversed, i.e., each power and information transferring pulse is transmitted before the respective time reference pulse. The time reference pulse is transmitted at a regular interval. Since the backscatter PPM pulse is generated from the resonance signal, which has a limited duration from the injected time-reference pulse due to damping, it will be more reliable if the backscatter pulses in the reverse link start immediately after the time-reference pulse. Using time-reversed PPM pulses in the forward link enables this. In this way, not only the time reference pulses can hold at a regular interval, but also limits the interval between the backscatter pulses in the reverse link and the time reference pulses to that of just a symbol length, plus a guard interval. Thus, the energy stored in the decaying oscillation signal generated in the resonance circuit 423 can be utilized without too much loss. This guarantees the backscatter pulses to have sufficient power in the operation when generated by switching on/off the first switch S1 to connect/disconnect the antenna 421 to/from the resonance circuit 423 at a designated PPM time slot. The decaying oscillation, i.e. the resonance signal, generated in the resonance circuit 423 is shown on the top of FIG. 5 indicated with Osc. The designated PPM time slot is the information bits to be transmitted encoded with the position of a time slot with respect to the time reference pulse. Note that in general, a PPM symbol may encode multi-bit information.

For reliable operation, guard intervals may be inserted. For example, a guard interval may be placed between each dual symbol duration for the transceiver module 410 to switch from receiving mode to transmitting mode. This interval is referred as a first interval, indicated by 1stGI in FIG. 5. In addition to that, on both side of a time reference pulse, a guard interval is inserted. That is within each dual symbol duration, a second guard interval 2ndGI is placed before a time reference pulse for separating the power and information pulse and the time reference pulse, and a third guard interval 3rdGI is placed after a time reference pulse for the transceiver module 410 to switch from transmitting mode to receiving mode.

The transponder 420 further comprises other digital operation blocks, such as a pulse detection unit pulse det 425, a timing determining unit timing 426, a digital frequency multiplier or a time divider freq mulp 427, a switch controller antenna ctl 428 and a processing unit MCU&periphery 429. The processing unit 429 may be a Micro Control Unit (MCU) which is used specifically in devices requiring low power consumption and is usually designed without extensive computation or processing and memory access support.

The pulse detection unit 425 is configured to detect whether there is a pulse signal.

The timing determining unit 426 is configured to determine timing of a received pulse signal relative to the time reference pulse.

The digital frequency multiplier or time divider 427 is configured to generate a clock signal clk based on the interval of the time reference pulse.

The switch controller 428 is configured to control operations of the transponder 420 by controlling the switch network 422.

The processing unit 429 is configured to generate control signals for the switch controller 422 and other designated operations such as measuring or other data acquisitions.

Since the transponder 420 relies on the energy sent by the transceiver module 410 in the forward link, the transponder 420 will be almost always on a cold start in operations. If the transponder 420 has its own oscillator, there will be certain time or frequency drift that may potentially have some negative impact on the BSR system operation.

In the PPM BSR system 400 according to embodiments herein, the transponder 420 does not have its own oscillator for timing but utilizes the time reference pulses from the transceiver module 410. That is the timing reference in the transponder 420 is derived from the forward link pulse intervals. In addition, the time reference pulse, which span a dual symbol duration is used for both demodulation and PPM transmission in the transponder 420. As shown in FIG. 4, the clock signal clk is generated by a digital frequency multiplier, instead of a local oscillator. Thus, the operation of the transponder 420 will not be affected by the drifting problem that often plagues a device in cold start operation.

As a simple design example, PPM pulses in both forward and reverse links may use 4-bit 16-PPM, i.e. 16 slots per symbol duration Note that depending on the application, the modulation alphabet, i.e. the symbol duration, in the forward and reverse links may be the same or different. That means the durations of the first and second symbol period may be the same or different. A long sequence of PPM pulses conveys more information than a short sequence. For PPM, a long sequence can be encoded with a symbol by increasing the number of slots contained in it. The forward and reverse links may have different data rates. For example, if a transponder needs to respond to a long sequence with a short sequence, the forward PPM may use 6-bit 64-PPM, the reverse PPM may use 3-bit 8-PPM. The guard interval duration may be chosen to be e.g. 2 slots, the interval between the time reference pulse will be 2+16+2+16+2=38 slots. In general, the time reference pulse interval, i.e., the dual symbol duration, is determined by $S_f + S_r + 3$ G slots, where $S_f$, $S_r$ are durations for the forward and reverse pulses respectively, G is the guard interval duration.

The 3-way switch network 422 is configured so that the control signal $\overline{K_r}$ connects the antenna 421 to the rectifier circuit 424 by default even without any logic operation is empowered. So before the transponder 420 is powered-up, all RF signal pulses, both the power and information pulse and time reference pulse transmitted by the transceiver module 410 in the forward link and received at the antenna 421 go to the rectifier circuit 423, until the transponder 420 is sufficient powered up that enables logic operations, such as switch control. That is the rectifier circuit 423 coverts the injected pulses to DC power for supplying the transponder 420 to start a normal operation with clocks and logic control for the switch network 422.

Although only one transponder is shown in FIG. 4 of the BSR system 400, there may be multiple transponders in the field of the transceiver module 410. If there are more transponders located closely in the field of the transceiver module 410, they are going to be powered-up as well. To avoid interference, conditional transmission is required for transponders. This is achieved by transmitting a ping signal from the transceiver module 410. The ping signal has frames and consists of multiple PPM symbols. The ping signal conveys certain commands, e.g. task type, and the address of the transponder that the transceiver wants to communicate with. So the initial transmission from the transceiver module 410 is a ping signal which contains an addressing or identity (ID) information for a target transponder. So when a transponder is sufficiently powered up, it will first check if the addressing/ID of the ping signal matches its own. The transponder 420 will only respond, i.e., start a normal operation, e.g. switching the antenna 421 to the resonance circuit 423 for generation of oscillation, generating PPM backscattering signals etc., when the addressing/ID matches its own.

During the normal operation, the transponder 420 is configured to:
  connect the rectifier circuit 424 to the antenna 421 by switching on the second switch S2 at beginning of the first symbol period to receive the power and information transferring pulse and convert the received power and information transferring pulse to DC power;
  disconnect the rectifier circuit 424 from the antenna 421 by switching off the second switch S2 at end of a power transferring pulse slot;
  connect the resonance circuit 423 to the antenna 421 by switching on the first switch S1 at beginning of the time reference pulse slot to receive the time reference pulse and generate the resonance signal in response to the received time reference pulse in the resonance circuit 423;
  disconnect the resonance circuit 423 from the antenna 421 by switching off the first switch S1 at end of the time reference pulse slot;
  connect the resonance circuit 423 to the antenna 421 by switching on the first switch S1 at beginning of a designated PPM time slot to generate and transmit the response radio frequency pulse signal with PPM in the reverse link from the transponder 420 to the transceiver module 410 during the second symbol period. The designated PPM time slot is configured to have a time offset with respect to the received time reference pulse such that the first and second symbol periods are separated in time domain; and
  disconnect the resonance circuit 423 from the antenna 421 by switching off the first switch S1 and connect the resonance circuit 423 to the rectifier circuit 424 by switching on the third switch S3 at end of the designated PPM time slot to convert the remaining resonance signal in the resonance circuit 423 to DC power thereby resetting the resonance circuit 423.

Figure 6:
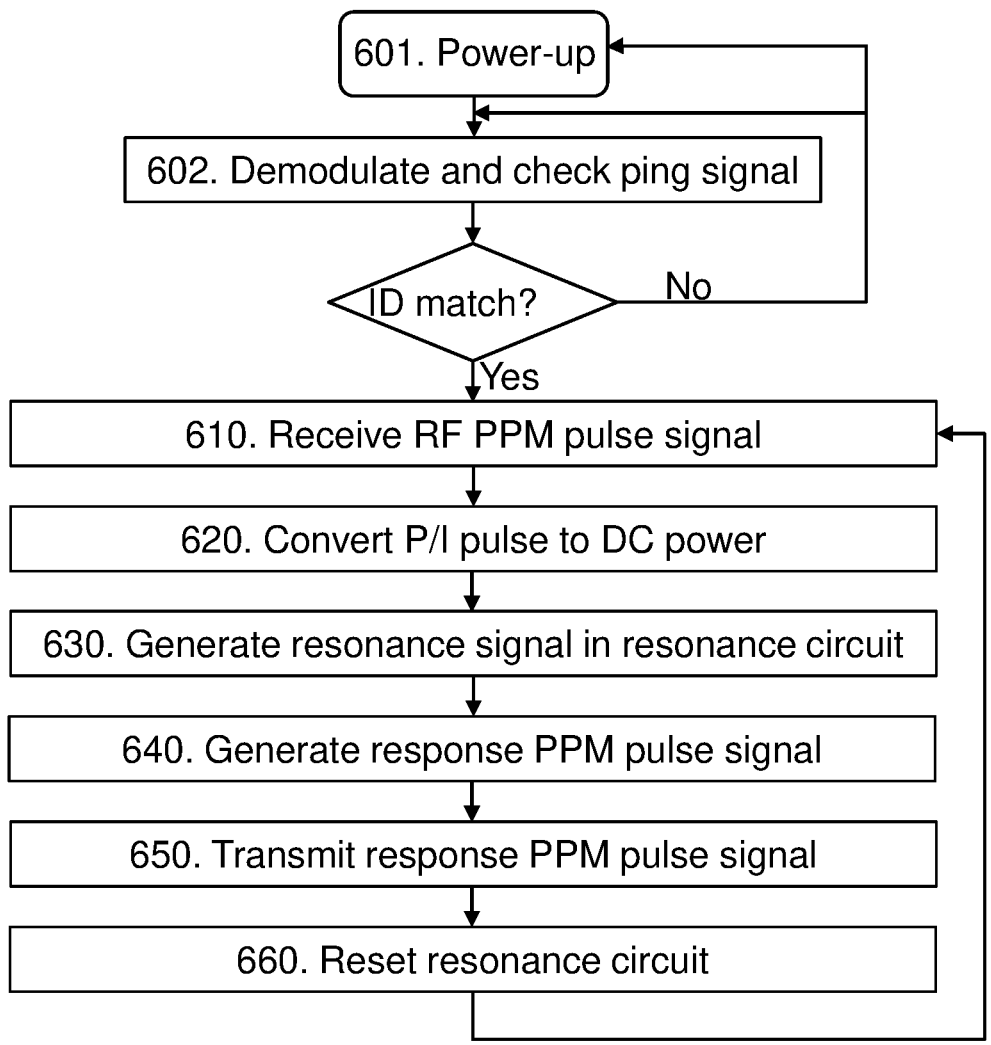
FIG. 6 is a flowchart depicting one embodiment of a method in a transponder according to embodiments herein.

A method performed in the transponder 420 for receiving power from a transceiver module 410 and for transferring information between the transponder 420 and transceiver module 410 in a backscatter radio system 400 according to embodiments herein will be described with reference to FIG. 6. The method comprises the following actions.

Action 601

As mentioned above, the transponder 420 relies on the energy sent by the transceiver module 410 in the forward link, and the transponder 420 will be almost always on a cold start in operations. Therefore, the operation of the transponder 420 is initialized by a power-up or initialization procedure.

During power-up procedure, the transponder 420 receives, at the antenna 421, a radio frequency pulse signal sent from the transceiver module 410. The radio frequency pulse signal comprises PPM pulses, e.g. a power and information transferring pulse and a time reference pulse within a dual symbol duration. All the pulses sent from the transceiver module 410 are in form of Gabor function. The antenna 421 is connected to the rectifier 424 by default during power-up procedure. Then both the incoming power and information transferring pulse and time reference pulse are injected to the rectifier 424 and converted to DC power. The energy of both the power and information transferring pulse and time reference pulse may be accumulated or stored on e.g. a capacitor. The stored power is used for supplying the transponder 420 during a normal operation, such as generating clock signals, switch control signals for the switch network 422, generating PPM backscattering signals etc.

During the power-up procedure, there is no backscatter PPM pulse generated and transmitted in the reverse link during the second symbol period of the dual symbol duration. The power-up time is not fixed since it depends on when a transponder is able to respond. The transceiver module 410 repeats transmitting a ping signal until it gets a response. There may be a maximal time interval defined, e.g. 1 second, for transmitting the ping signal. After the maximal time interval is expired, if no response is received from a target transponder, this transponder will be considered failed, or not in the field of the transceiver module 410.

Action 602

When the transponder 420 is sufficiently powered up, logic operations in the digital operation blocks of the transponder 420, such as in the pulse detection unit 425 and processing unit 429, are performed to demodulate a ping signal containing an addressing or ID information. The transponder 420 checks the ID or addressing information and will only respond, i.e., start a normal operation, when the addressing or ID matches its own. By responding only when it is pinged, simultaneous responses from multiple transponders can be avoided. Thus, interferences from neighboring transponder devices can be avoided.

Action 610

During the normal operation, the transponder 420 receives, at the antenna 421, a radio frequency pulse signal transmitted in a forward link from the transceiver module 410 to the transponder 420 during a first symbol period. The radio frequency pulse signal comprises a power and information transferring pulse and a time reference pulse within the first symbol period.

Action 620

The transponder 420 converts the received power and information transferring pulse to power in the rectifier circuit 423 by switching on the second switch S1 during the power transferring and information pulse slot.

Action 630

The transponder 420 generates a resonance signal in the resonance circuit 423, in response to the received time reference pulse by switching on the first switch S1 during the time reference pulse slot. The resonance circuit is configured to have a resonant frequency at a carrier frequency of the received time reference pulse and the resonance signal is generated at the carrier frequency of the received time reference pulse.

Action 640

The transponder 420 generates a response radio frequency pulse signal with PPM by switching on the first switch S1 during a designated PPM time slot within the second symbol period. The designated PPM time slot is configured with a time offset such that the first and second symbol periods are separated in time domain Action 650

The transponder 420 transmits the generated response radio frequency pulse signal in a reverse link from the transponder 420 to the transceiver module 410 during the second symbol period Action 660

The transponder 420 resets the resonance circuit 423 by switching on the third switch S3 each time after the response radio frequency pulse signal has been transmitted.

During the normal operation, the transponder 420 performs Actions 610-660 until the communication between the transceiver module 410 and the transponder 420 has been finished. Then the antenna 421 is connected to the rectifier circuit 424 by switching on the second switching S2 using the control signal $\overline{K}_r$.

After the normal operation, the incoming pulses disappear and the transponder 420 falls in a hibernating state or sleeping mode and waits for next communication. The antenna 421 is connected to the rectifier 424 during hibernating state or sleeping mode. When the next communication starts, the transponder 420 performs Actions 601 and 602 and then Actions 610-660.

Figure 7:
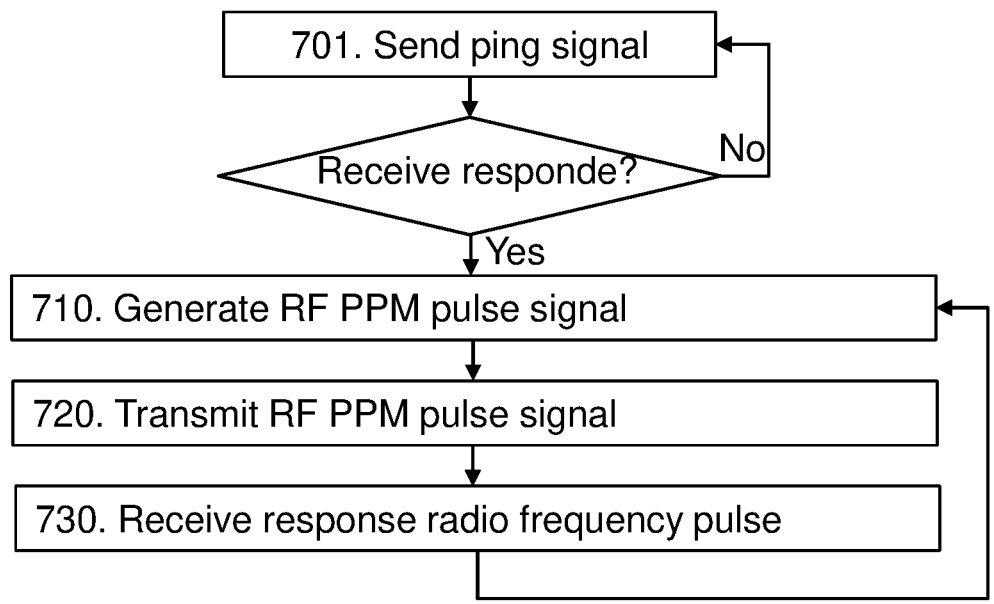
FIG. 7 is a flowchart depicting one embodiment of a method in a transceiver module according to embodiments herein.

A method performed in the transceiver module 410 for transferring power to a transponder 420 and for transferring information between the transceiver module 410 and transponder 420 in a backscatter radio system 400 according to embodiments herein will be described with reference to FIG. 7. The method comprises the following actions.

Action 701

The transceiver module 410 may send a ping signal and check if a responding signal is received. The ping signal contains an addressing or identity (ID) information for a target transponder. When a transponder is sufficiently powered up, it will first check if the addressing/ID of the ping signal matches its own. A transponder will only respond, i.e., start a normal operation when the addressing/ID matches its own.

When a responding signal is received from a transponder, e.g. the transponder 420, the transceiver module 410 enters in a normal operation, i.e. the communication between the transceiver module 410 and transponder 420 starts, and the transceiver module 410 performs the following actions.

Action 710

The transceiver module 410 generates a radio frequency pulse signal with Pulse Position Modulation (PPM). The generated radio frequency pulse signal comprises a power and information transferring pulse and a time reference pulse within a dual symbol duration comprising a first symbol period and a second symbol period. The information is coded by the position of the power and information transferring pulse with respect to the time reference pulse. The radio frequency pulse signal is generated with a parameterized Gabor pulse function.

Action 720

The transceiver module 410 transmits the radio frequency pulse signal in a forward link from the transceiver module 410 to the transponder 420 during the first symbol period.

The power and information transferring pulse enables a power injection to a rectifier circuit comprised in the transponder 420 and the time reference pulse enables an excitation of a resonance signal in a resonance circuit 423 comprised in the transponder 420.

Action 730

The transceiver module 410 receives a response radio frequency pulse signal with PPM in a reverse link from the transponder 420 to the transceiver module 410 during the second symbol period. The response radio frequency pulse signal with PPM is generated using the resonance signal generated in the resonance circuit 423 comprised in the transponder 410 with a time offset such that the first and second symbol periods are separated in time domain.

According to embodiments herein, to perform the method for transferring power to a transponder 420 and for transferring information between the transceiver module 410 and transponder 420 in a backscatter radio system 400, the transceiver module 410 comprises a transmitter 411, a receiver 412, a processing unit 413, as shown in FIG. 4.

The transceiver module 410 is configured to, e.g. by means of the processing unit 413 being configured to, generate a radio frequency pulse signal with Pulse Position Modulation (PPM). The generated radio frequency pulse signal comprises a power and information transferring pulse and a time reference pulse within a dual symbol duration comprising a first symbol period and a second symbol period. The information is coded by the position of the power and information transferring pulse with respect to the time reference pulse.

The transceiver module 410 is configured to, e.g. by means of the transmitter 411 being configured to, transmit the generated radio frequency pulse signal in a forward link from the transceiver module 410 to the transponder 420 during the first symbol period.

The transceiver module 410 is configured to, e.g. by means of the receiver 412 being configured to, receive a response radio frequency pulse signal with PPM in a reverse link from the transponder to the transceiver module during a second symbol period. The response radio frequency pulse signal with PPM is generated using the resonance signal generated in the resonance circuit 423 comprised in the transponder 420 with a time offset such that the first and second symbol periods are separated in time domain.

Figure 8:
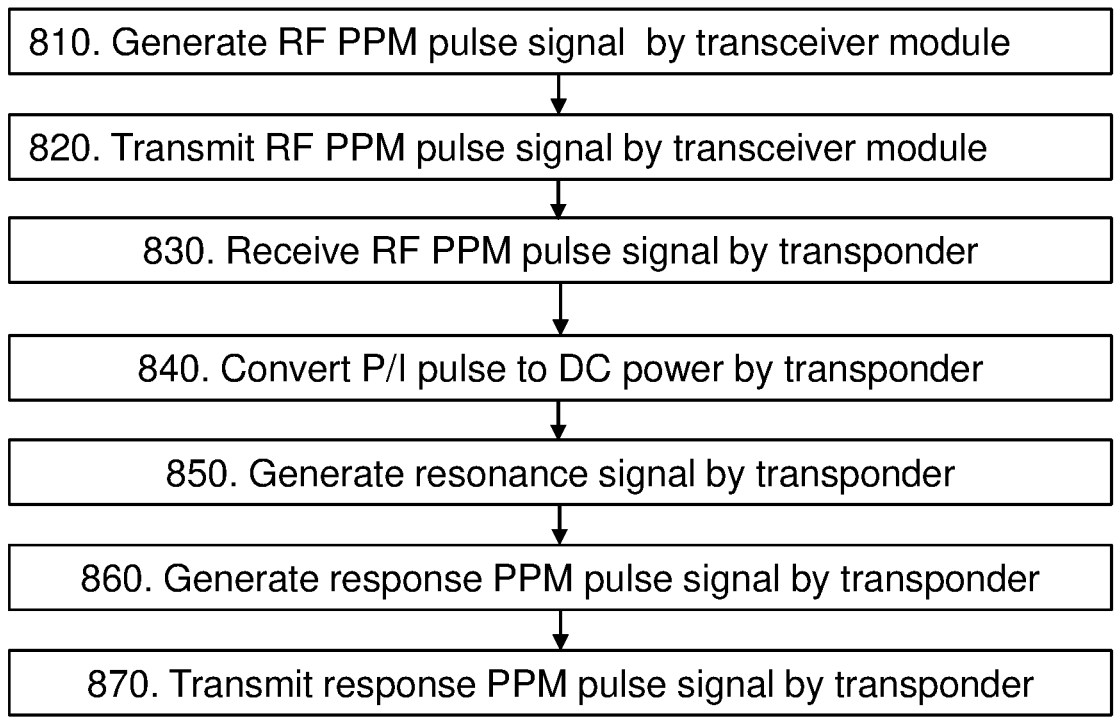
FIG. 8 is a flowchart depicting one embodiment of a method in a BSR system according to embodiments herein.

A method performed in the backscatter radio system 400 for transferring power and information according to embodiments herein will be described with reference to FIG. 8. The method comprises the following actions.

Action 810

The transceiver module 410 generates a radio frequency pulse signal with Pulse Position Modulation (PPM). The generated radio frequency pulse signal comprises a power and information transferring pulse and a time reference pulse within a dual symbol duration comprising a first symbol period and a second symbol period. The information is coded by the position of the power and information transferring pulse with respect to the time reference pulse. The radio frequency pulse signal is generated with a parameterized Gabor pulse function.

Action 820

The transceiver module 410 transmits the radio frequency pulse signal in a forward link from the transceiver module 410 to the transponder 420 during the first symbol period. The power and information transferring pulse enables a power injection to a rectifier circuit comprised in the transponder 420 and the time reference pulse enables an excitation of a resonance signal in a resonance circuit 423 comprised in the transponder 420.

Action 830

The transponder 420 receives the radio frequency pulse signal from the transceiver module 410.

Action 840

The transponder 420 converts the received power and information transferring pulse to DC power.

Action 850

The transponder 420 generates a resonance signal in the resonance circuit 423 at a carrier frequency of the received time reference pulse, in response to the received time reference pulse.

Action 860

The transponder 420 generates a response radio frequency pulse signal with PPM during a second symbol period.

Action 870

The transponder 420 transmits the response radio frequency pulse signal with PPM in a reverse link from the transponder 420 to the transceiver module 410 during the second symbol period.

To summarize, the backscatter radio system 100, 400 according to embodiments herein has the following characters and advantages:

- A radio frequency (RF) pulse signal is generated and transmitted by the transceiver module 110, 410. The RF pulse signal is in the form of Gabor pulses, which is limited in both time and frequency domain with flexible allocations. Thus, easily adjustable according to regulations.
- Due to the flexibility of choosing frequency and time offset of the Gabor pulse, the resonating PPM BSR system according to embodiments herein can operate in a vast spectrum of choices, for example, the ISM band widely used for RFID devices.
- The transponder 420 is energized by the transceiver module 110, 410 in a Wireless Power Transferring (WPT) process, where the RF signal is sent as a chain of Gabor pulses with higher rectifier efficiency than e.g. a single carrier CW or any OFDM waveform.
- Both forward-link and reverse-link signals of the BSR system 100, 400 are PPM modulated, which are separated in time domain where both modulation/demodulation functionalities can be implemented with simple digital logics.
- The passive transponder 420 does not need a dedicated time reference. Instead, it oscillates by resonating directly on the carrier frequency of the forward link pulse and uses the time reference pulse intervals, i.e. dual symbol duration, in the forward link as its time reference. This significantly reduces the complexity and the power consumption of the transponder 420 by eliminating the need for local oscillator and synchronization.
- The radio frequency PPM pulse signal enables the transponder 410 of the BSR system 100, 400 in a monostatic configuration with shared Tx/Rx antenna to be implemented economically and compactly, e.g. massively built in UEs.

When using the word "comprise" or "comprising" it shall be interpreted as non-limiting, i.e. meaning "consist at least of".

The embodiments herein are not limited to the above-described preferred embodiments. Various alternatives, modifications and equivalents may be used. Therefore, the above embodiments should not be taken as limiting the scope of the invention, which is defined by the appended claims.

The invention claimed is:

1. A transponder for receiving power from a transceiver module and for transferring information between the transponder and transceiver module in a backscatter radio system, the transponder comprising:
an antenna configured to receive a radio frequency pulse signal in a forward link from the transceiver module to the transponder during a first symbol period and transmit a response radio frequency pulse signal in a reverse link from the transponder to the transceiver module during a second symbol period, both the radio frequency pulse signal and the response radio frequency pulse signal are modulated with Pulse Position Modulation, PPM, and the received radio frequency pulse signal comprises a power and information transferring pulse and a time reference pulse within a dual symbol duration comprising the first symbol period and the second symbol period;
a switch network coupled to the antenna;
a resonance circuit coupled to the antenna by a first switch in the switch network, the resonance circuit being configured to have a resonant frequency at a carrier frequency of the received time reference pulse and generate a resonance signal at the carrier frequency of the received time reference pulse in response to the received time reference pulse;
a rectifier circuit coupled to the antenna by a second switch in the switch network and configured to convert the received power and information transferring pulse to power; and
the response radio frequency pulse signal with PPM being generated using the resonance signal generated in the resonance circuit with a time offset such that the first and second symbol periods are separated in time domain.

2. The transponder according to claim 1, wherein the rectifier circuit is further coupled to the resonance circuit by a third switch in the switch network, and wherein during operation, the rectifier circuit is configured to convert the remaining resonance signal in the resonance circuit to power thereby resetting the resonance circuit by switching on the third switch.

3. The transponder according to claim 1, wherein the transponder further comprises:
a pulse detection unit configured to detect whether there is a pulse signal;
a timing determining unit configured to determine timing of a received pulse signal relative to the time reference pulse;
a digital frequency multiplier or time divider configured to generate a clock signal based on the interval of the time reference pulse;
a switch controller configured to control operations of the transponder by controlling the switch network; and
a processing unit configured to generate control signals for the switch controller and other designated operations.

4. The transponder according to claim 1, wherein during operation, the transponder is configured to:
connect the rectifier circuit to the antenna by switching on the second switch at beginning of the first symbol period to receive the power and information transferring pulse and convert the received power and information transferring pulse to power;
disconnect the rectifier circuit from the antenna by switching off the second switch at end of the power transferring pulse slot;
connect the resonance circuit to the antenna by switching on the first switch at beginning of the time reference pulse slot to receive the time reference pulse and generate the resonance signal in response to the received time reference pulse in the resonance circuit;
disconnect the resonance circuit from the antenna by switching off the first switch at end of the time reference pulse slot; and connect the resonance circuit to the antenna by switching on the first switch at beginning of a designated PPM time slot to generate and transmit the response radio frequency pulse signal with PPM in the reverse link from the transponder to the transceiver module during the second symbol period, and wherein the designated PPM time slot is configured to have the time offset with respect to the received time reference pulse such that the first and second symbol periods are separated in time domain;
disconnect the resonance circuit from the antenna by switching off the first switch and connect the resonance circuit to the rectifier circuit by switching on the third switch at end of the designated PPM time slot to convert the remaining resonance signal in the resonance circuit to power thereby resetting the resonance circuit.

5. A method performed in a transponder for receiving power from a transceiver module and for transferring information between the transponder and transceiver module in a backscatter radio system, the transponder comprising a resonance circuit coupled to an antenna by a first switch, a rectifier circuit coupled to the antenna by a second switch and to the resonance circuit by a third switch, the method comprising:
receiving, at the antenna, a radio frequency pulse signal transmitted in a forward link from the transceiver module to the transponder during a first symbol period, the radio frequency pulse signal being modulated with Pulse Position Modulation, PPM, and comprising a power and information transferring pulse and a time reference pulse within a dual symbol duration comprising the first symbol period and a second symbol period, and the information being coded by the position of the power and information transferring pulse with respect to the time reference pulse;
converting the received power and information transferring pulse to power in the rectifier circuit by switching on the second switch during the power transferring and information pulse slot;
generating a resonance signal in the resonance circuit, in response to the received time reference pulse by switching on the first switch during the time reference pulse slot, the resonance circuit being configured to have a resonant frequency at a carrier frequency of the received time reference pulse and the resonance signal is generated at the carrier frequency of the received time reference pulse;
generating a response radio frequency pulse signal with PPM by switching on the first switch during a designated PPM time slot within the second symbol period, the designated PPM time slot being configured with a time offset such that the first and second symbol periods are separated in time domain;

transmitting the generated response radio frequency pulse signal in a reverse link from the transponder to the transceiver module during the second symbol period; and resetting the resonance circuit by switching on the third switch each time after the response radio frequency pulse signal has been transmitted.

6. The method according to claim 5, further comprising demodulating a ping signal and checking if an addressing or ID information contained in the ping signal matches its own.

7. A backscatter radio system for transferring power and information, the backscatter radio system comprising a transceiver module and a transponder, the backscatter radio system being configured to:

generate by the transceiver module, a radio frequency pulse signal with Pulse Position Modulation, PPM, the generated radio frequency pulse signal comprising a power transferring pulse and a time reference pulse within a dual symbol duration comprising a first symbol period and a second symbol period, and the information being coded by the position of the power and information transferring pulse with respect to the time reference pulse;

transmit the radio frequency pulse signal in a forward link from the transceiver module to the transponder during the first symbol period, the power and information transferring pulse enabling a power injection to a rectifier circuit comprised in the transponder and the time reference pulse enables an excitation of a resonance signal in a resonance circuit comprised in the transponder;

receive at the transponder, the radio frequency pulse signal from the transceiver module;

convert at the transponder, the received power and information transferring pulse to power;

generate a resonance signal at a carrier frequency of the received time reference pulse in the resonance circuit comprised in the transponder, in response to the received time reference pulse;

generate by the transponder, a response radio frequency pulse signal with PPM during the second symbol period; and transmit the response radio frequency pulse signal with PPM in a reverse link from the transponder to the transceiver module during the second symbol period, the response radio frequency pulse signal with PPM being generated using the resonance signal generated in the resonance circuit comprised in the transponder with a time offset such that the first and second symbol periods are separated in time domain.

8. A method performed in a backscatter radio system for transferring power and information, the backscatter radio system comprising a transceiver module and a transponder, the method comprising:

generating by the transceiver module, a radio frequency pulse signal with Pulse Position Modulation, PPM, the generated radio frequency pulse signal comprising a power and information transferring pulse and a time reference pulse within a dual symbol duration comprising a first symbol period and a second symbol period, and the information being coded by the position of the power and information transferring pulse with respect to the time reference pulse;

transmitting the radio frequency pulse signal in a forward link from the transceiver module to the transponder during the first symbol period, the power and information transferring pulse enabling a power injection to a rectifier circuit comprised in the transponder and the time reference pulse enables an excitation of a resonance signal in a resonance circuit comprised in the transponder;

receiving at the transponder, the radio frequency pulse signal from the transceiver module;

converting at the transponder, the received power and information transferring pulse to power;

generating in the resonance circuit comprised in the transponder, a resonance signal at a carrier frequency of the received time reference pulse in response to the received time reference pulse;

generating by the transponder, a response radio frequency pulse signal with PPM during the second symbol period;

transmitting the response radio frequency pulse signal with PPM in a reverse link from the transponder to the transceiver module during the second symbol period; and the response radio frequency pulse signal with PPM being generated using the resonance signal generated in the resonance circuit comprised in the transponder with a time offset such that the first and second symbol periods are separated in time domain.

9. The method according to claim 8, wherein modulation alphabet of PPM in the forward link and reverse link are the same or different.

10. The method according to claim 8, wherein durations of the first and second symbol period are the same or different.

11. The method according to claim 8, further comprising:

sending by the transceiver module a ping signal containing an addressing or identity information for a target transponder; and demodulating by the transponder the ping signal and checking if the addressing or identity information matches its own.

\* \* \* \* \*